June 23, 1970 C. S. BOLAND 3,516,258

WORK PLATFORM

Filed Sept. 6, 1968 10 Sheets-Sheet 1

INVENTOR.
CALVIN STUART BOLAND
BY Rogers, Bereskin, & Parr

June 23, 1970 C. S. BOLAND 3,516,258

WORK PLATFORM

Filed Sept. 6, 1968 10 Sheets-Sheet 2

INVENTOR.

CALVIN STUART BOLAND

BY

Rogers, Bereskin, & Parr

INVENTOR.
CALVIN STUART BOLAND

BY Rogers, Bereskin, & Parr

*INVENTOR.*

CALVIN STUART BOLAND

*BY* Rogers, Bereskin, & Parr

INVENTOR.
CALVIN STUART BOLAND
BY Rogers, Bereskin, & Parr

June 23, 1970 C. S. BOLAND 3,516,258

WORK PLATFORM

Filed Sept. 6, 1968 10 Sheets-Sheet 6

INVENTOR.
CALVIN STUART BOLAND

BY Rogers, Bereskin, & Parr

INVENTOR.
CALVIN STUART BOLAND
BY Rogers, Bereskin, & Parr

WORK PLATFORM

Filed Sept. 6, 1968

INVENTOR.
CALVIN STUART BOLAND
BY Rogers, Bereskin, & Parr

WORK PLATFORM

Filed Sept. 6, 1968

INVENTOR.
CALVIN STUART BOLAND
BY Rogers, Bereskin, & Parr

INVENTOR.
CALVIN STUART BOLAND
BY Rogers, Bereskin, & Parr

United States Patent Office 3,516,258

Patented June 23, 1970

3,516,258

WORK PLATFORM

Calvin S. Boland, Toronto, Ontario, Canada, assignor to Boland Development Company Limited, Toronto, Ontario, Canada Filed Sept. 6, 1968, Ser. No. 758,033
Int. Cl. E21d *19/02*
U.S. Cl. 61—45 12 Claims

ABSTRACT OF THE DISCLOSURE

A work platform which suspends itself between tunnel walls by horizontal jacks projecting from upper and lower jack frames. The jack frames are connected so that each can be moved horizontally back and forth, and vertically up and down relative to the other. The machine can thus be "walked" in a tunnel by extending the horizontal jacks of one jack frame against the walls, retracting those of the other jack frame, moving the other jack frame, extending its horizontal jacks against the tunnel walls, retracting those of the first jack frame, moving the first jack frame, and repeating the steps.

This invention relates to a work platform, and more particularly it relates to a work platform adapted to support itself between a pair of generally opposed spaced walls. Such a platform is particularly useful in mining applications.

In mines, tunnels are frequently encountered having irregular and often steep grades. It is frequently desired to position drilling (or other) machinery in such a tunnel e.g. to drill into the floor, walls or roof of the tunnel, and to move the machinery along the tunnel as the work progresses. If the floor of the tunnel is highly irregular or steeply sloping, it is difficult to support machinery on such a floor and to move it along the tunnel.

Accordingly, the present invention provides a work platform which supports itself between the walls of such a tunnel, instead of on the tunnel floor. The platform includes (a) A lower jack frame having lower horizontal jack means thereon, said lower horizontal jack means including opposed pressure members extensible to press against said walls to support said lower jack frame between said walls, (b) An upper jack frame having upper horizontal jack means thereon, said upper horizontal jack means including opposed pressure members extensible to press against said walls to support said upper jack frame between said walls, (c) And connecting means coupling said jack frames together for forward and rearward movement of said jack frames relative to each other, and for generally vertical movement of said jack frames relative to each other, said connecting means including first motive means for moving said jack frames forwardly and rearwardly relative to each other, and second motive means for moving said jack frames generally vertically relative to each other.

By reason of the jack and connecting arrangements, the platform can be "walked" along the tunnel, as will be described in detail presently. With such an arrangement, the irregularity or slope of the tunnel floor is immaterial; in fact, the platform can move up or down a vertical shaft if necessary. Machinery such as drilling machinery can be located on the platform for use as desired.

In one specific embodiment of the invention the upper and lower jack frames are connected by vertical jacks which can be extended and retracted to move the jack frames vertically up and down relative to each other. A forward movement jack is connected between one of the jack frames and one of the vertical jacks, to swing one jack frame frontwardly and rearwardly relative to the other. Side movement jacks are connected between one jack frame and two of the vertical jacks to swing one jack frame from side to side relative to the other. Each jack frame carries a pair of horizontal jacks, one at each end, so that the machine can be "walked" by extending the horizontal jacks of one jack frame against the walls, retracting those of the other jack frame, moving the other jack frame, extending its horizontal jacks against the tunnel walls, retracting those of the first jack frame, moving the first jack frame, and repeating.

Further objects and advantages of the invention will appear from the following disclosure, taken together with the accompanying drawings, in which.

Figure 1:
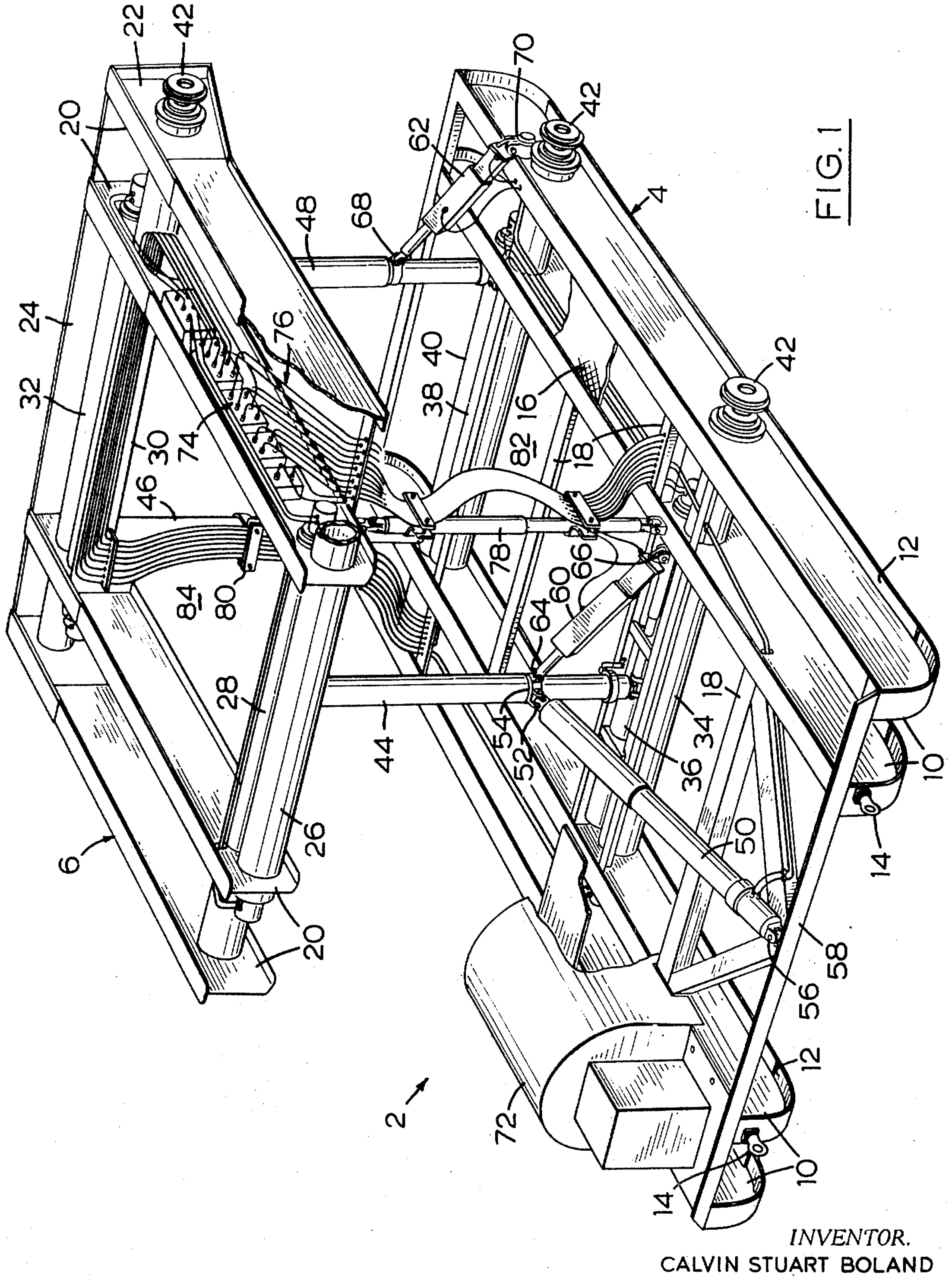
FIG. 1 is a perspective view of a work platform according to the present invention.
Figure 4:
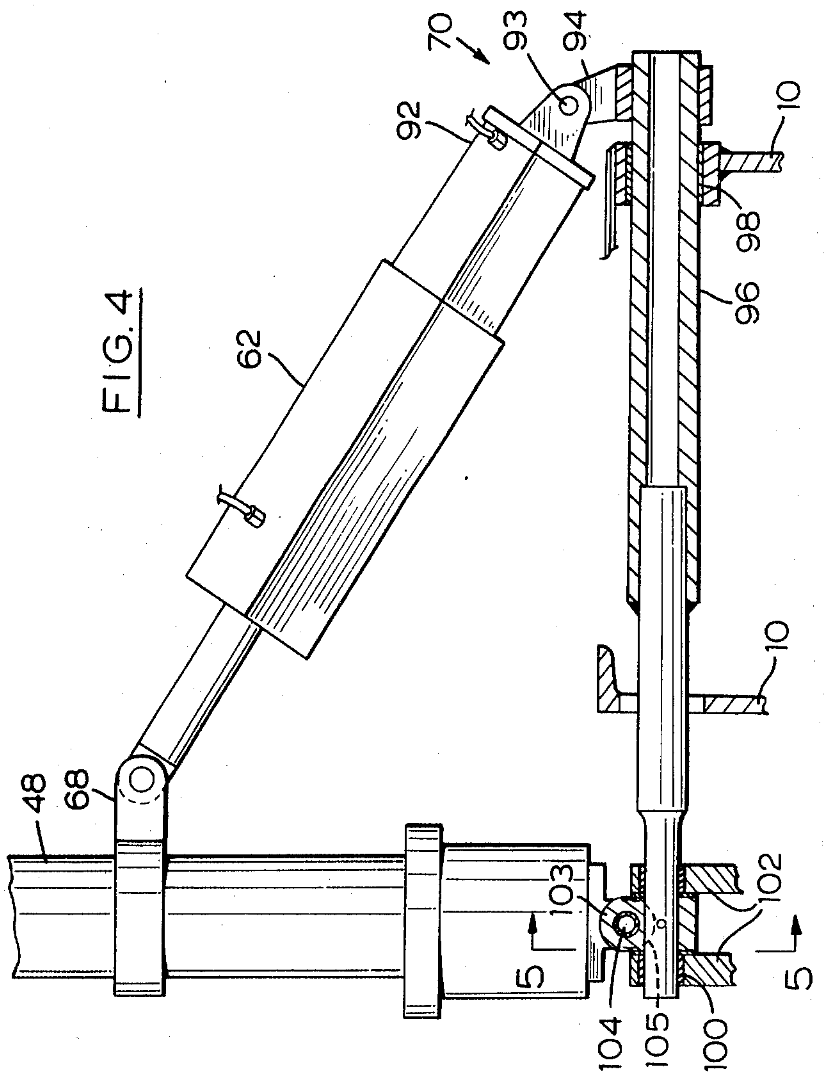
Figure 5:
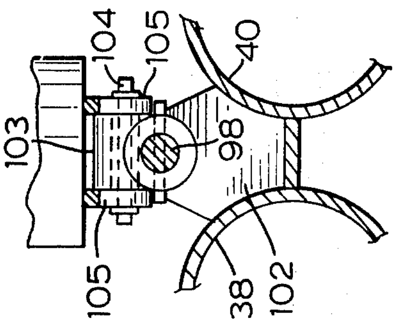
Figure 6:
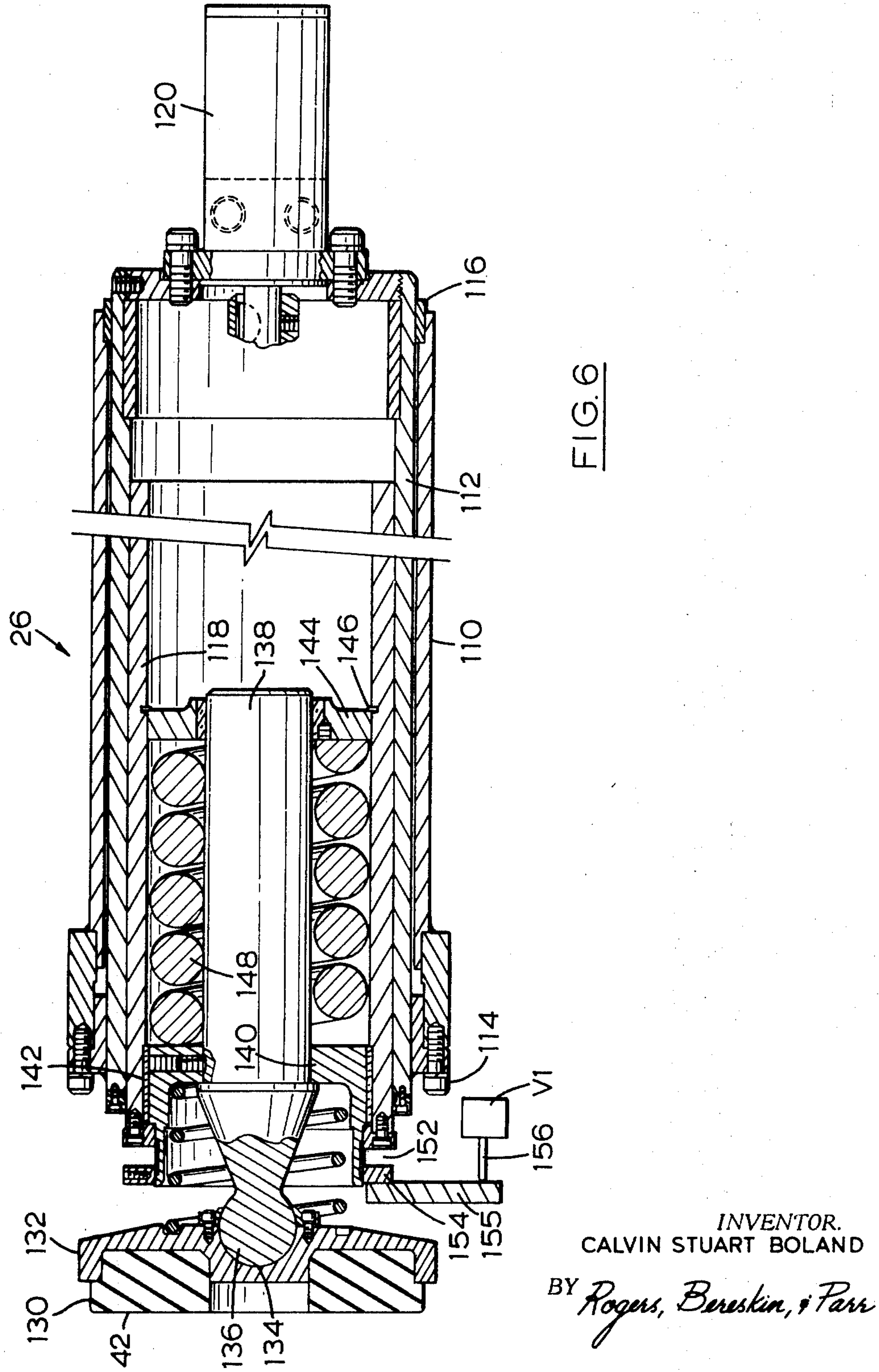
Figure 7:
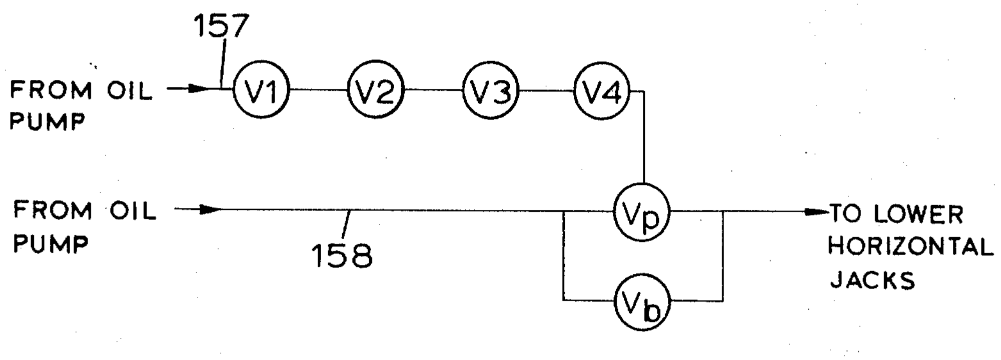
Figure 8:
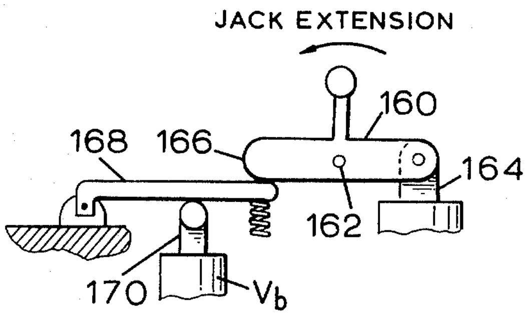
Figure 9:
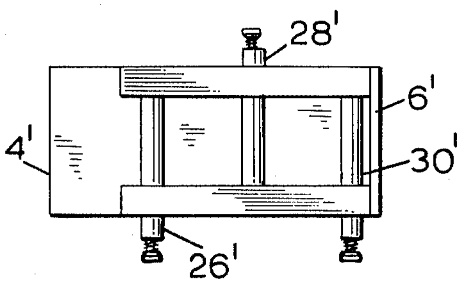
Figures 10, 11, 18A:
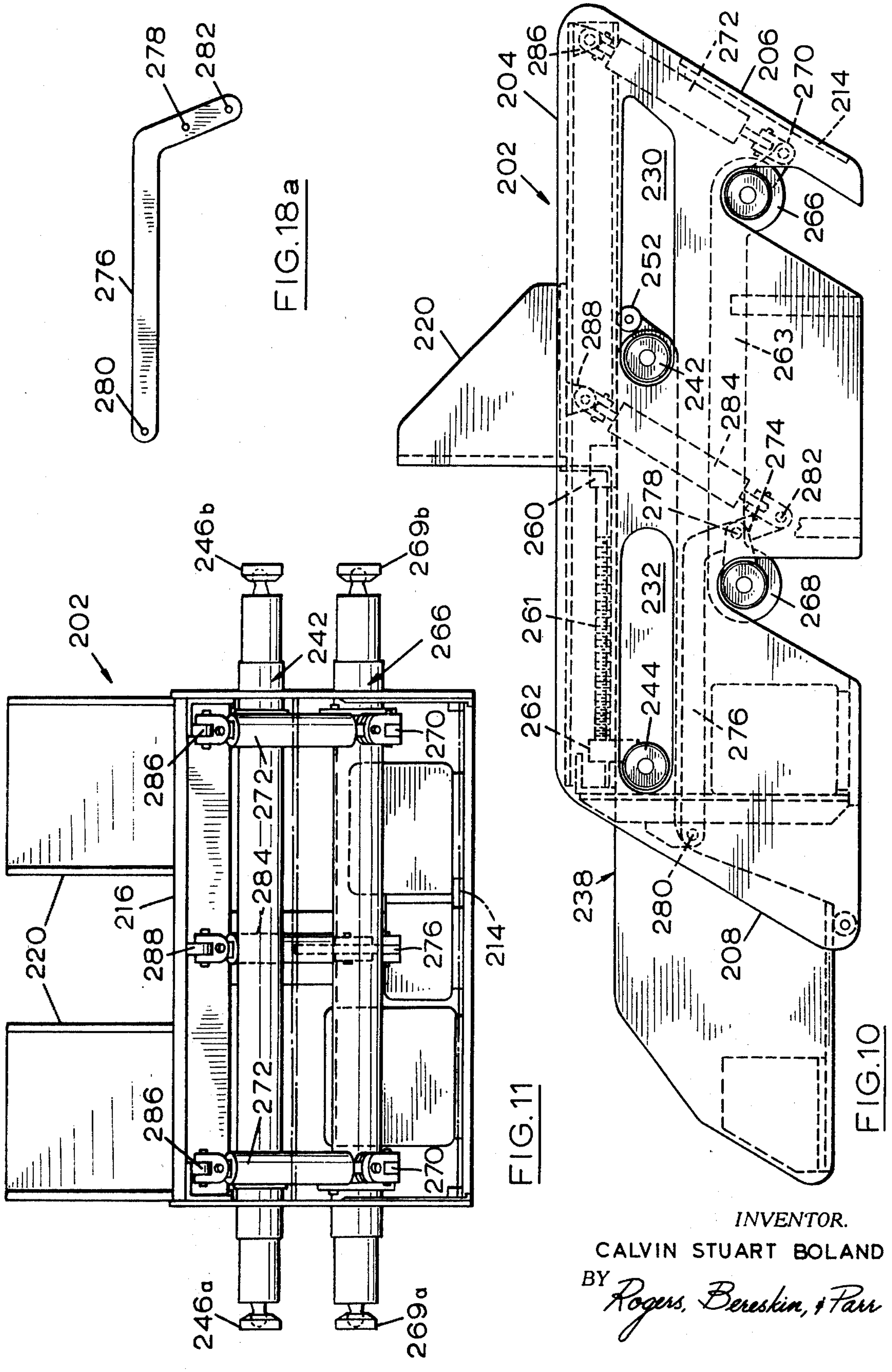
Figures 12, 13:
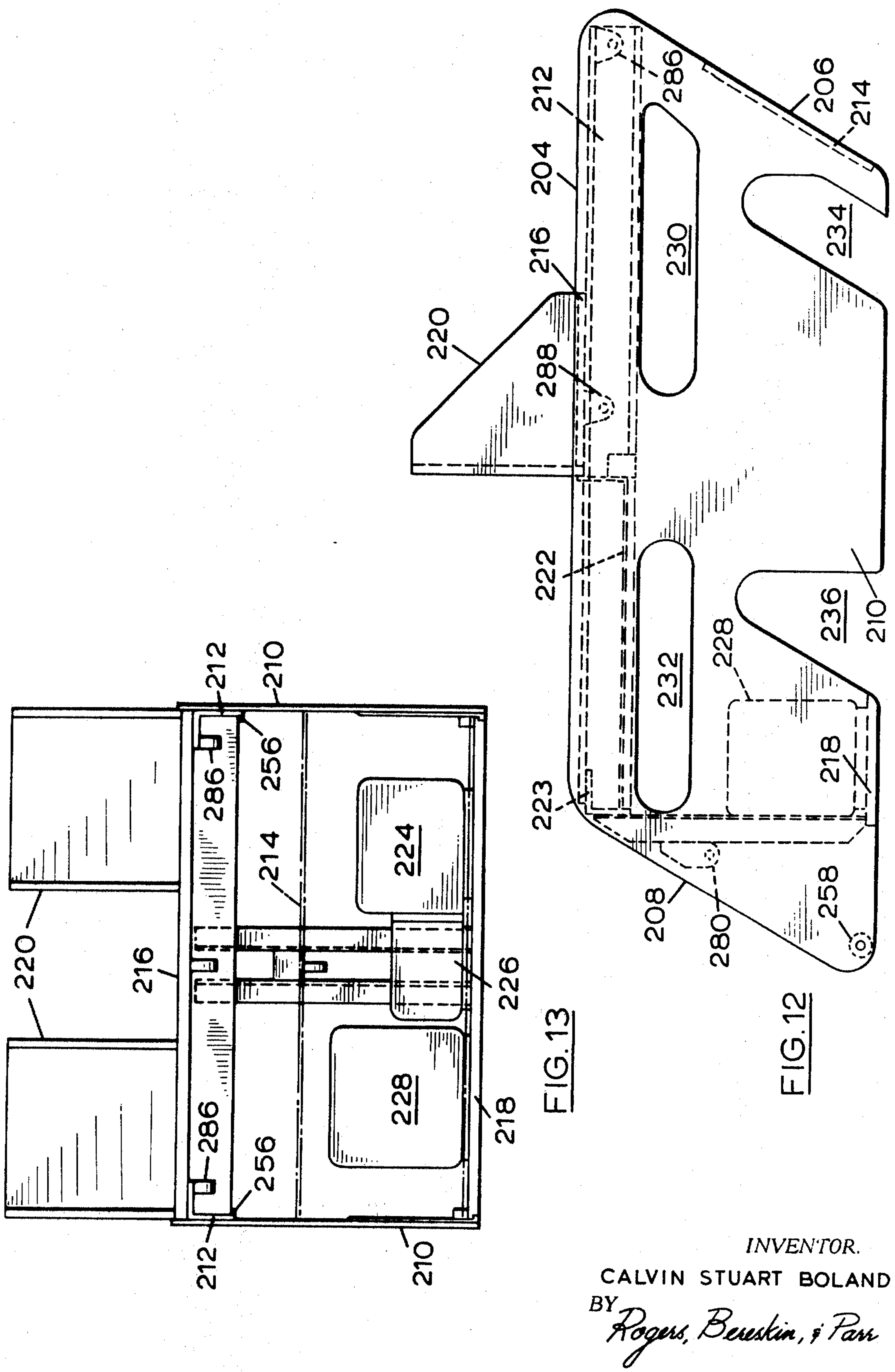
Figure 15:
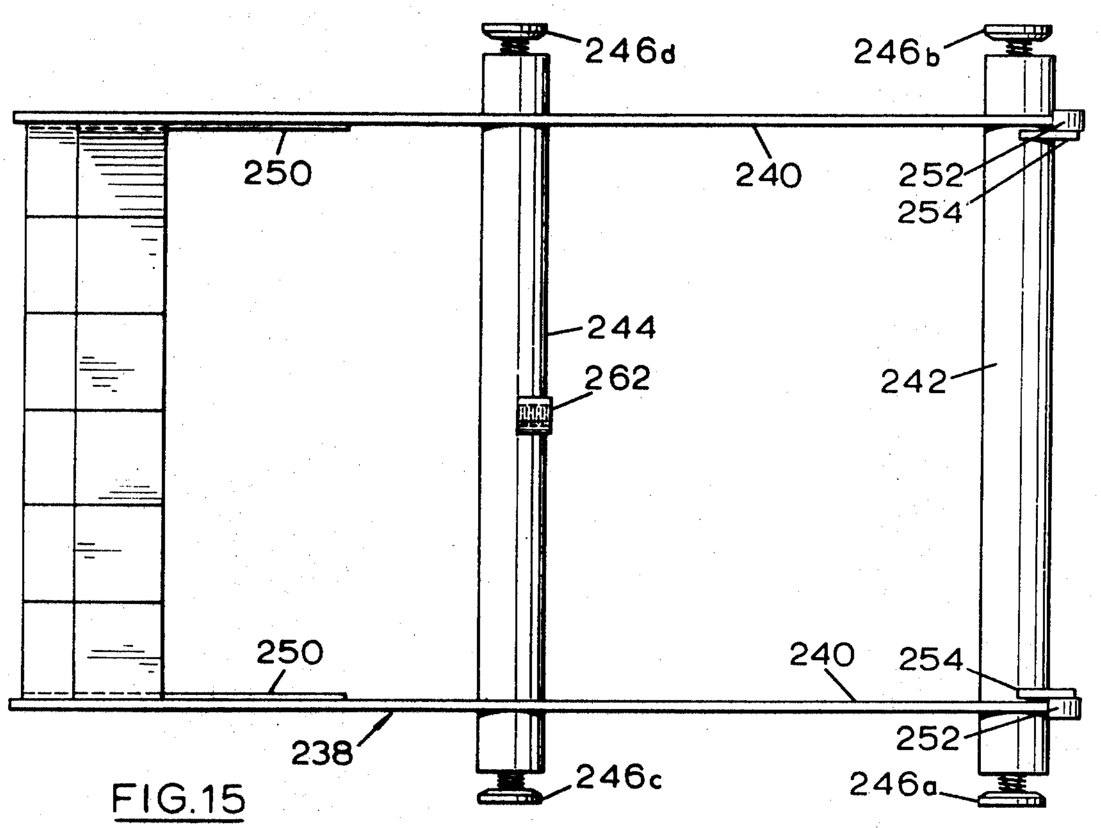
Figures 14, 16:
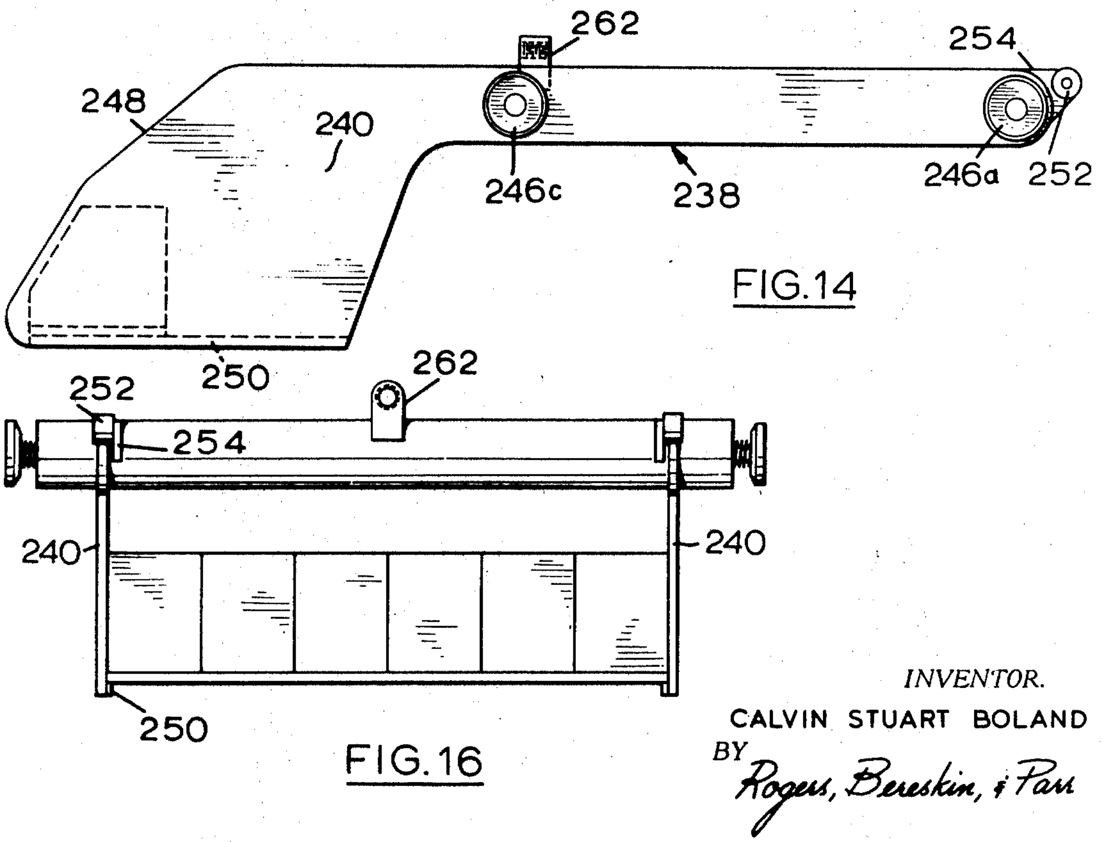
Figures 17, 18:
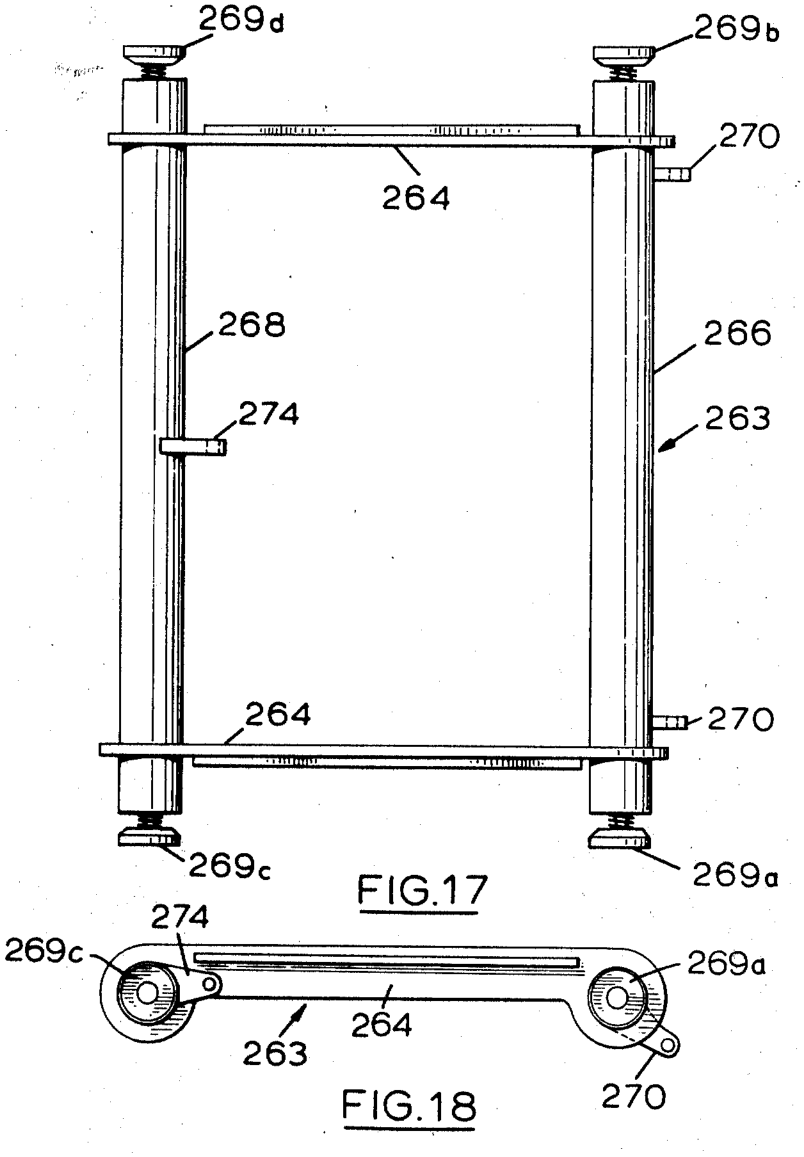

FIGS. 3*a* to 3*d* illustrate diagrammatically the operation of the FIG. 1 platform in a tunnel;

FIG. 4 is a side view, partly in section, showing the connection of a side movement jack to the base in the FIG. 1 platform;

FIG. 5 is a section taken along lines 5—5 of FIG. 4;

FIG. 6 is a side section showing the construction of a horizontal jack of the FIG. 1 platform;

FIG. 7 shows schematically a hydraulic circuit for safety valves for the horizontal jacks;

FIG. 8 shows a jack control valve and bypass valve for use with the circuit of FIG. 7;

FIG. 9 is a top view illustrating diagrammatically a modification of the FIG. 1 platform;

FIG. 10 is a side view of another work platform according to the invention;

FIG. 11 is a front view of the FIG. 10 work platform but without its front plate;

FIG. 12 is a side view of the main frame of the FIG. 10 work platform;

FIG. 13 is a front view of the main frame of FIG. 12 with the front plate removed;

FIG. 14 is a side view of the upper jack frame of the FIG. 10 platform;

FIG. 15 is a top view of the upper jack frame of FIG. 14;

FIG. 16 is a front view of the upper jack frame of FIG. 14;

FIG. 17 is a top view of the lower jack frame of the FIG. 10 platform;

FIG. 18 is a side view of the lower jack frame of FIG. 17; and

FIG. 18A shows a stabilizing bar to be connected between the lower jack frame and the main frame in the FIG. 10 platform.

Figure 2:
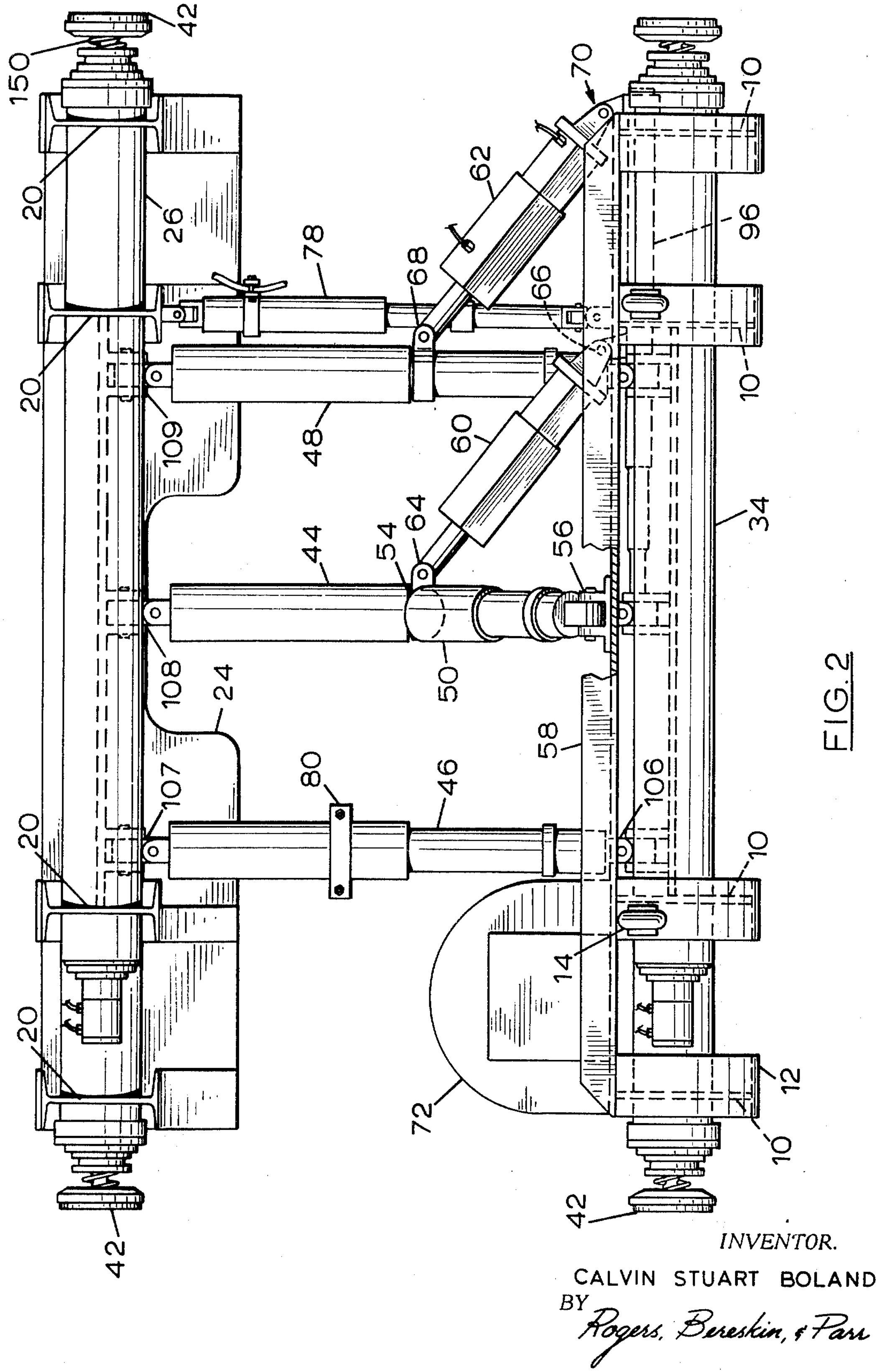
FIG. 2 is a front view of the FIG. 1 platform.

Referring to FIGS. 1 and 2, there is shown a work platform generally indicated at 2 and having a lower jack frame 4 and an upper jack frame 6. The lower jack frame 4 includes four parallel heavy steel beams 10 each with a bottom plate 12 welded thereto. Each plate 12 is curved upwardly at its front and rear to assume a shape somewhat like the hull of a boat. Rings 14 are fastened to the ends of the centre pair of plates 12 to facilitate towing or dragging the work platform to an appropriate tunnel (for example). The top of the lower jack fram 4 is decked with an expanded metal floor 16 to support an operator standing on the lower jack frame. Secondary support beams 18 are provided for additional rigidity.

The upper jack frame 6 includes four parallel beams 20 (I beams) extending parallel to the beams 10 of the base and positioned thereabove. At their fronts, the beams 20 are enlarged, as shown at 22 (FIG. 1). The enlarged ends 22 carry a heavy front crossplate 24 which forms a mounting plate to support a drill or other tool (not shown).

The lower and upper jack frames 4, 6 each contain four horizontal jacks extending across the width of the platform. The horizontal jacks of the upper jack frame are indicated at 26, 28, 30, 32 and those of the lower jack frame at 34, 36, 38, 40. The four horizontal jacks of the upper jack frame are located two at the front and two at the rear of the upper jack frame, so that the free end of a horizontal jack projects from each side of the front and rear of the upper jack frame. Each horizontal jack is a screw-type jack operated by a hydraulic motor, as will be described in more detail presently. Each horizontal jack contains, at its free end, a pressure pad assembly 42 adapted to press against the wall of a space in which the platform is located.

As will be apparent from the drawings, the outer casings of the horizontal jacks pass through the beams 10 and 20 and are welded thereto, so that the horizontal jacks in effect form main structural members connecting the beams. The free ends of the horizontal jacks are each extensible and retractable by two feet, so that the work platform can be used in a tunnel the side walls of which vary in spacing by as much as nearly four feet. (A greater degree of extensibility can be provided for the horizontal jacks if necessary.)

The lower jack frame 4 is connected to the upper jack frame 6 by a rear vertical jack 44, and a pair of front vertical jacks 46, 48. The upper and lower ends of the vertical jacks 44, 46, 48 are connected to the upper jack frame 6 and to the lower jack frame 4 respectively by universal joints. This arrangement permits front to rear swinging of the lower jack frame with respect to the upper jack frame, and also permits side to side swinging of one with respect to the other.

Frontward and rearward swinging of the lower jack frame 4 relative to the upper jack frame 6 is achieved by a forward movement jack 50. This jack is connected by a universal joint 52 to a mounting bracket 54 located part way up the rear vertical jack 50. The forward movement jack 50 extends rearwardly from universal joint 52, diagonally downwardly and is connected at another universal joint 56 to a cross member 58 extending across the rear of the lower jack frame.

Side to side movement of the lower jack frame relative to the upper jack frame is achieved by a pair of side movement jacks 60, 62. Jack 60 is connected by a joint 64 (which allows vertical pivoting) to the bracket 54 around the outer casing of the rear vertical jack 44. Jack 60 extends sidewardly and diagonally downwardly and is connected to the lower jack frame 4 by a special universal joint arrangement 66 to be described, to allow forward and rearward pivoting in unison of rear vertical jack 44 and side movement jack 60. The other side movement jack 62 is similarly connected to the front vertical jack 48 by a joint 68 and to the lower jack frame 4 by another special universal joint 70 similar to joint 66. The side movement jacks will normally be hydraulic piston and cylinder assemblies, rather than screw jacks, because they may be required to yield during operation of the horizontal jacks 26 to 40 as will be explained.

Since all of the jacks shown are hydraulically actuated, a motor and pump assembly 72 is provided, located at the rear of the lower jack frame 4 and to one side thereof. The motor will typically be pneumatically operated for mine use, thus eliminating the need for any electrical connections to the work platform.

Hand operated control valves for the jacks are diagrammatically indicated at 74. In the simplest control system, there will be a separate control for each of the fourteen jacks of the platform, but provision may be made if desired for operating the four horizontal jacks of the upper jack frame simultaneously, for operating the four horizontal jacks of the lower jack frame simultaneously, for operating the three vertical jacks simultaneously, and for operating the two side movement jacks simultaneously. The details of such a control system are a matter of choice readily apparent to those skilled in the art and do not form part of the present invention.

From the control valves 74, oil lines collectively indicated at 76 extend to the various jacks and cylinders, and to the motor and pump assembly 72. A telescopic hose support tube 78, connected by universal joints to the upper and lower jack frames, supports and guides some of the oil lines 76 as they extend between the upper and lower jack frames. The remainder of the oil lines are guided and supported by a bracket 80 connected to front vertical jack 46.

It will be noted that because of its construction, the lower jack frame 4 includes an unencumbered central area 82 located between the vertical jacks 44, 46, 48, on which an operator may stand. This unencumbered central space is available because of the elongated rear part of the lower jack frame 4, on which the motor and pump assembly 72 and the horizontal movement jack 50 are mounted. The weight of these components is balanced by the weight of a drill or other tool mounted on the cross plate 24 at the front of the work platform.

Similarly, the upper jack frame 6 contains an unobstructed central open space 84, bounded at its sides by the inner beams 22, and at its front and rear by the horizontal jacks 28, 30. When an operator is standing on the floor 16 of the lower jack frame, his head will project through the space 84 so that he may conveniently control a tool mounted on the cross plate 24 and so that he may operate the valves 74 to actuate the jacks of the work platform. The drill or other tool will usually be pneumatically actuated, and will be supplied from a flexible air hose laid along the tunnel floor and extending up to the work platform. The same air supply may be used to operate the motor and pump assembly 72.

The overall operation of the device is as follows. Assume that the platform has been moved into a tunnel 85 (diagrammatically shown in FIG. 3*a*) and is now about to suspend itself between the tunnel walls 86, part way between the floor 87 and the roof 88 of this tunnel. In this event, the operator will extend the vertical jacks 44, 46, 48, (which, together with the horizontal jacks, are usually retracted during transportation of the platform) to raise the upper jack frame 6 to an elevated position. He will then extend the horizontal jacks 26 to 32 of the upper jack frame so that their pressure pad assemblies 42 press firmly against the workspace walls. He will then retract the vertical jacks 44, 46, 48, to raise the lower jack frame 4 clear of the ground. The horizontal jacks of the lower jack frame are retracted at this time and do not engage the walls of the workspace. This situation is diagrammatically shown in the side view of FIG. 3*b* and the top view of FIG. 3*c*.

Figure 3A:
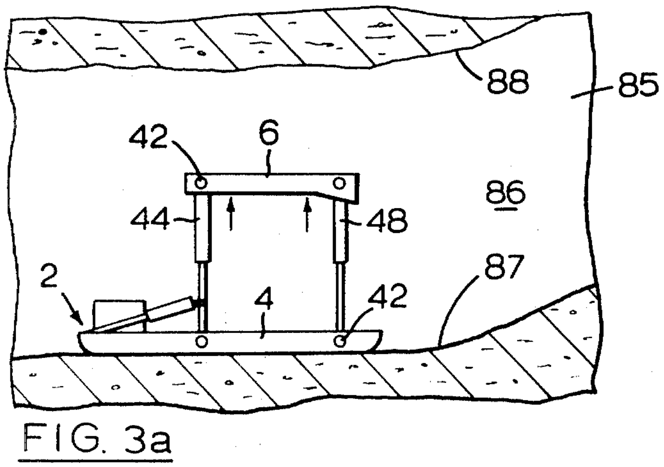
Figure 3B:
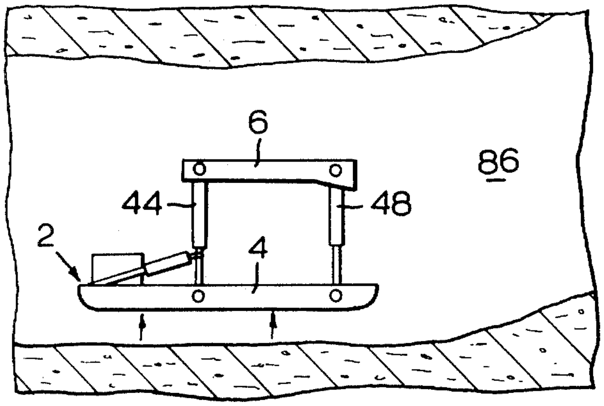
Figure 3C:
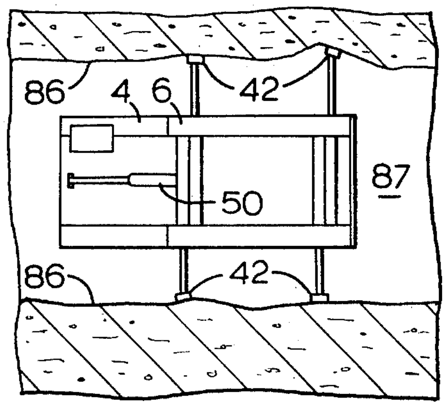
Figure 3D:
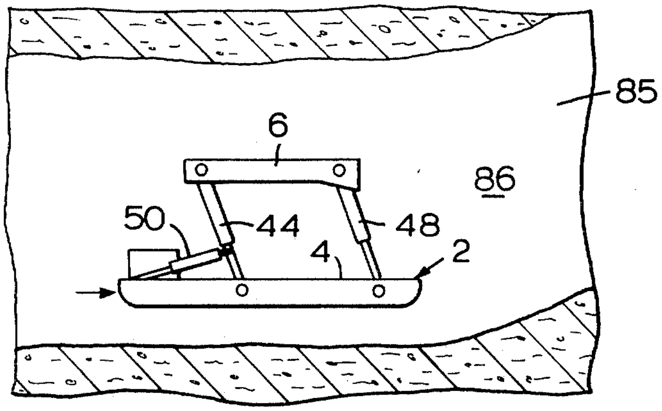

It will be noted that the surface of the workspace walls can be quite irregular, as indicated in FIG. 3*c*. This is because the pressure pad assemblies 42 are pivotally mounted at the free ends of the horizontal jacks and can therefore adjust to wall irregularity to a substantial extent. The details of the pivotal mounting of the pressure pad assemblies will be described presently, in connection with FIG. 6.

After the platform has been elevated to the desired extent, the operator will activate the forward movement jack 50 to swing the lower jack frame 4 forwardly with respect to the upper jack frame 6. The vertical jacks 44, 46, 48 may be extended at this time if space permits, to increase the length of the forward step. After a forward step has been taken, the horizontal jacks of the lower jack frame are extended so that their pressure assemblies 42 press firmly against the tunnel walls. The situation is now as diagrammatically shown in FIG. 3*d*.

After the pressure assemblies 42 of the lower jack frame horizontal jacks have been firmly pressed against the walls of the workspace, with sufficient pressure to support the platform, the pressure assemblies 42 of the upper jack frame horizontal jacks are retracted clear of the walls. The forward and backward movement cylinder 50 is then activated to swing the upper jack frame 6 forwardly with respect to the lower jack frame 4. The vertical jacks 44, 46, 48 may, during this operation, be retracted and then extended, depending upon whether there is sufficient clearance at the roof of the workspace. In this manner, the platform may be advanced step-by-step along the tunnel. If the workspace slants upwardly, or downwardly, the movement of the platform may be made to correspond by appropriate control of the vertical jacks 44, 46, 48. The platform can in fact be used in a purely vertical shaft, being stepped upwardly or downwardly by appropriate control of the vertical and horizontal jacks.

It may be noted that only three vertical jacks 44, 46, 48 have been provided, instead of four such vertical jacks. This arrangement simplifies greatly the control of the work platform. If four vertical jacks were provided, it would be necessary to control carefully the length setting of each, whereas with three such jacks, it does not matter if the length settings of the vertical jacks are not all precisely identical. Provision of only three vertical jacks also allows easy tilting of the plane of the upper jack frame 6 in any direction with respect to the plane of the lower jack frame 4.

The side movement jacks 60, 62 are provided to allow tilting of the lower and upper jack frames 4, 6 laterally with regard to the walls of the workspace or tunnel. These jacks may be used when the walls of the workspace are not quite vertical, or when for some reason it is desired to tilt the platform relative to the walls even though the walls are vertical, in order to position the drill or other machinery on the platform in a desired manner. They may also be used for "walking" the platform sideways if the occasion should arise.

The reason why the side movement jacks are piston and cylinder type jacks, and not screw jacks, is as follows. It will occasionally happen when the horizontal jacks in the base or upper deck are being extended, that one will contact a wall before the other (e.g. the pads of jacks 34, 38, may contact a wall before the pads of jacks 36, 40). This will tend to force the base sideways relative to the upper deck (or vice versa). This imposes a load on the side movement jacks (which are normally held fixed by lock valves, not shown). In order that the side movement jacks may yield under this load, they are provided with relief valves (not shown) set to open at a pressure somewhat higher than that required to operate the side movement jacks. This allows the side movement jacks to yield when the horizontal jacks on one side of the platform contact a wall before the horizontal jacks on the other side of the platform.

Reference is next made to FIGS. 4 and 5 which show the universal joint arrangement 70 which the front side movement jack 62 is connected to the lower jack frame 4 and to the vertical jack 48. As there shown, an end 92 of jack 62 is connected by a pin 93 to a pair of ears 94 fixed to a shaft 96. The shaft 96 is rotatably journalled in a bushing 98 in the outer beam 10, and extends inwardly above and between the outer casings of horizontal jacks 38, 40, and through the inner beam 10. At its inner end, shaft 96 is rotatably journalled in a bushing 100 contained by a pair of ears 102 fixed to the outer casings of horizontal jacks 38, 40.

Fixed to the inner end of shaft 96 is a socket 103. A pin 104 passes through socket 103 and through a pair of ears 105 fixed to the bottom of vertical jack 48, to complete the universal joint connection of jack 48 to the base 4.

With the arrangement just described, vertical jack 48 and side movement jack 62 tilt in unison when forward movement jack 50 is actuated to move the upper jack frame 6 (for example) with respect to the lower jack frame 4. Substantially the same arrangement is used for universal joint assembly 66 which connects the rear side movement jack 60 to the lower jack frame 4 and connects the bottom of rear vertical movement jack 44 to the lower jack frame 4 (as shown in FIG. 1). The bottoms of vertical jacks 44, 48 could of course be connected to base 4 by universal joints entirely separate from those connecting jacks 60, 62 to the base, but the arrangement shown helps to ensure alignment of the jacks.

The bottom of vertical jack 46 is connected to base 4 by a conventional universal joint 106 (FIG. 2) fixed to the outer casings of horizontal jacks 38, 40. The tops of the vertical jacks are connected to the outer casings of the upper horizontal jacks by conventional universal joints 107, 108, 109 (FIG. 2).

Reference is next made to FIG. 6, which shows one of the horizontal jacks (specifically, jack 26) of the upper jack frame in more detail. All of the horizontal jacks are identical.

It will be seen that the jack 26 includes an outer casing 110, this being the casing that is welded or otherwise fastened to the beams 22. The jack 26 is also includes an outer fixed sleeve 112 fixed to the casing 110 by screws 114 (which hold the sleeve 112 against a stop 116 at the end of the outer casing), and an inner sliding sleeve 118 movable within the outer sleeve 112. The pressure pad assembly 42 is mounted at the free end of the inner sleeve. The jack mechanism may be removed for repair or replacement by removing the screws 114 and sliding the outer sleeve 112 out of the casing 110.

The inner sleeve 118 is moved with respect to the outer sleeve 112 by a hydraulic motor 120, the body of which is connected to the outer sleeve 112. The shaft of the motor drives a screw turning in a nut (not shown) connected to the inner sleeve 118, so that when the motor operates, the nut moves axially relative to the screw and thus extends or retracts the innersleeve 118 and pressure pad assembly attached thereto. Screw mechanisms of this nature are standard and need not be described in detail.

The pressure pad assembly 42 is circular in outline as viewed from its end and includes a heavy rubber pad 130 seated snugly in a holder 132. The holder 132 includes a socket 134 which holds a ball 136, the ball and socket forming a ball joint to permit the pressure pad assembly 34 to swivel and tilt. The ball 136 forms the tip of a shaft 138 journaled at its outer end in a guide 140 slidably mounted in the inner sleeve 118. A sleeve bearing 142 is provided at the sliding surfaces between guide 140 and sleeve 118. At its inner end the shaft 138 is similarly slidably journaled in a holder 142 held by a retaining ring 146 to the inner sleeve 118. The shaft 138 is normally urged to the position shown in FIG. 6 by a compression spring 148 of strength such that a force of 20,000 lbs. is required to compress it by a distance of one-half inch. The spring 148 bears against the fixed holder 144 and urges the sliding holder 140 outwardly.

A secondary compression spring 150, which may also be termed a garter spring, acts between the outer surface of the holder 140 and the inner surface of the holder 132 to prevent the pressure pad assembly from flopping about or dropping when it is retracted out of engagement with a wall.

In operation, as the hydraulic motor 120 is operated to force the inner sleeve outwardly and move the pressure pad assembly 42 into engagement with a wall, the shaft 138 is forced inwardly, compressing the compression spring 148. The degree of compression of spring 148 may be observed by observing the narrowing of a gap 152 between the end of the outer sleeve 112 and a sight ring 154 fixed to the end of the holder 140. This gap is normally one-half inch, and when it closes, this indicates to the operator of the platform that the pressure pad assembly 42 is compressed against the wall with a force of about 20,000 lbs. When the operator has ascertained that all four horizontal jacks on the upper jack frame deck 6 are pressed against the walls with this much force, he may then retract the horizontal jacks at the lower jack frame, since the force of the upper jacks will be sufficient to hold the work platform suspended between the walls with a substantially safety margin. (Other types of pressure indicators may alternatively be used, if desired.) The compressed spring 148 allows slight wall crumbling without complete loss of force against the wall.

In order to ensure that the horizontal jacks of the lower jack frame cannot be retracted when the horizontal jacks of the upper jack frame are already retracted (or vice versa), a safety valve system is provided, as shown in FIGS. 6 and 7. As shown in FIG. 6, a valve operating arm 155 is fixed to the sight ring 154 so that, when the sight ring moves inwardly, arm 155 also moves and compresses the actuator 156 of a safety valve V1 (which is assumed to be hydraulic but which can also be pneumatic).

Each of the horizontal jacks has a similar safety valve arrangement, the valves for horizontal jacks 26, 28, 30, 32 being shown as V1, V2, V3, V4 respectively in FIG. 7. An oil line 157 from the oil pump (not shown) in the motor and pump assembly 72 leads through valves V1 to V4 to a pilot valve $V_p$. Pilot valve $V_p$ is mounted on an oil line 158 through which flows the oil for the lower horizontal jacks 34, 36, 38, 40.

Valves V1 to V4 are normally off and do not permit oil to flow therethrough unless their actuators (such as actuator 156 for valve V1) are depressed. When all four upper horizontal jacks 26 to 32 are extended to press against the surrounding walls with a pressure of 20,000 pounds each (other pressures could be used), the actuators of valves V1 to V4 are all depressed and oil from line 157 reaches pilot valve $V_p$. This actuates valve $V_p$ to permit oil to flow through line 158 to operate the lower horizontal jacks which may now be retracted.

In order to bypass valves V1 to V4 to retract the horizontal jacks (e.g. when the work platform is lying on the tunnel floor and is to be hauled out of the tunnel), a normally closed bypass valve $V_b$ may be opened manually to bypass valve $V_p$. In addition, to permit extension of horizontal jacks whenever desired, a control arrangement such as that shown in FIG. 8 may be provided for each horizontal jack. In FIG. 8, a directional control lever 160 is pivoted at 162 is provided for each horizontal jack. Movement of lever 160 in the direction of the arrow extends actuator 164 to extend the horizontal jack associated with control lever 160. The free end 166 of lever 160 depresses a spring biased bar 168 whenever the control lever 160 is pushed in the direction of the arrow, thus depressing an actuator 170 of the bypass valve $V_b$. This enables *extension* of the horizontal jacks at any time. However, the horizontal jacks of one jack frame cannot be retracted unless those of the other jack frame are pressed against a wall or unless the bypass valve is manually actuated.

A similar connection of the safety valves (not shown) for the lower horizontal jacks controls operation of the upper horizontal jacks.

The vertical jacks 44, 46, 48 are screw operated jacks similar to the horizontal jacks, but the vertical jacks lack the compression spring and sight ring arrangement provided for the horizontal jacks.

It will be evident that various changes can be made in the platform described. For example, the front plate 24 can be removed, and the space arrangements on the platform can be varied, depending on the application desired for the platform. The purpose of the platform is, of course, to carry men or equipment or both, and the applications for the platform are numerous.

Although pressure pads have been shown at the ends of the horizontal jacks, other appropriate devices, such as fingers, or "stingers" that pierce the walls, can be used.

The motor and pump assembly could be powered electrically instead of pneumatically if desired, or another type of power could be used. In fact, the screw type jacks could be directly electrically powered if desired.

Although one forward movement and two side movement jacks have been shown, this could be reversed (if the locations of the vertical jacks were shifted by 90 degress, so that the vertical jacks are at the sides of the platform). In this event there would be one side movement and two forward movement jacks.

Although four horizontal jacks have been shown on the base and on the upper deck, this number could be increased, or it could be reduced to three. An arrangement of three horizontal jacks is shown diagrammatically in FIG. 10 (where primed reference numerals indicate corresponding parts) and is quite useful for travel in a vertical circular shaft.

If desired, the operator can be seated on a seat suspended from the upper jack frame, so that the controls will not move relative to him as the platform moves. Alternatively, the operator can stand or sit on the lower jack frame as before, and the controls can be placed on the lower jack frame.

Reference is next made to FIGS. 10 and 11, which illustrate at 202 another embodiment of a work platform according to the invention. The work platform 202 includes a main frame 204, shown by itself in FIGS. 12 and 13. The main frame 204 as viewed from the side is generally in the form of a parallelogram having front and rear surfaces 206, 208 sloping at an angle (e.g. 60 degrees) relative to the top and bottom surfaces. The main frame 204 includes a pair of side plates 210 braced by channels 212 and connected together by a front plate 214, a top plate 216, and bottom plates such as that shown at 218. It is again assumed that the work platform is to be used in mines to drill holes in work faces for explosives, and accordingly, the main frame includes drill mounts 220 mounted on the top of the main frame. The drill mounts 220 support a drill boom not shown. (Top plate 216 extends forwardly only to the front of the drill mounts 220, so that the drill boom can swing downwardly.) An operator platform 222 is mounted behind the drill mounts, on the top of the main frame. The operator platform is constituted by a simple deck structure formed from metal plates (with a hump in the middle for an actuating screw to be described). The operator platform 222, and an angle beam 223 at its rear, serve further to connect together the side plates 210.

The main frame further typically includes an air motor 224 supported on the boom plates 218 at the rear of the main frame. The air motor 224 is powered by air lines normally available in a mine and operates a pump 226 which pressurizes the oil from a tank 228 to drive the various hydraulic mechanisms on the work platform.

Finally, the side plates 210 of the main frame each include a pair of in line front and rear horizontal slots 230, 232 near the top of the main frame. These slots accommodate upper horizontal jacks of a top jack frame as will be described. The side plates of the main frame further include front and rear generally vertical slots 234, 236. These slots slant slightly forwardly and accommodate lower horizontal jacks of a bottom jack frame, as will also be described.

Reference is next made to FIGS. 14 and 16 which illustrate an upper jack frame 238 for the work platform. The upper jack frame includes side plates 240 to which are connected (e.g. by welding) the frame tubes of a pair of upper horizontal jacks 242, 244. These jacks contain pressure pads 246*a* to 246*d* which press against the walls of the workspace when the jacks are extended. At its rear end the upper jack frame includes a counterweight support portion 248 having a pair of bottom bearing plates 250 (FIG. 15) projecting slightly inwardly from the side plates 240.

The upper jack frame 238 is mounted in the main frame 204 as follows. At its front, the upper jack frame 238 includes a pair of rollers 252 journalled on plates 254 welded to the side plates 240 of the upper jack frame. These rollers 252 bear against the underside 256 (FIG. 13) of the channels 212 at the sides of the main frame. At the rear of the upper jack frame, the bearing plates 250 rides on rollers 258 (FIG. 12) similar to rollers 252 but journalled at the back of the main frame 204.

In addition, the outer frame tubes of the upper horizontal jacks 242, 244 extend through the slots 230, 232 at the sides of the main frame 204.

Relative motion between the upper jack frame 238 and the main frame 204 is achieved by a hydraulic motor 260 (FIG. 10) fastened in any desired manner to the main frame 204. The hydraulic motor 260 turns a long screw 261 which revolves inside a nut 262 (FIGS. 10, 14 and 16) fastened to the rear upper horizontal jack 244. In operation, assuming that the upper jack frame 238 is located in the position shown at FIG. 10 with respect to the main frame 204, with the upper horizontal jacks at the left hand sides of the slots 230, 232, then, when the screw is turned in the correct direction it will pull the upper jack frame 238 to the right and will move the upper horizontal jacks to the right in their slots, until the rear of the upper jack frame, including the counterweight support portion 248, is entirely retracted within the main frame.

The work platform 202 further includes a lower jack frame 263 shown in FIGS. 17 and 18. The lower jack frame includes a pair of side plates 264 to which are welded the outer frame tubes of front and rear lower horizontal jacks 266, 268. The lower horizontal jacks include pressure pads **269*a* to 269*d* adapted to be pressed against the walls of a workspace. In addition, the front surface of the jack 266 contains projecting brackets 270 to which are connected two front vertical jacks 272 (best shown in FIGS. 10 and 11). The front surface of the rear lower horizontal jack 268 contains a projecting support bracket 274. A stabilizing bar 276 (shown by itself in FIG. 18A) is pivotally connected at 278 to the support bracket 274 and is pivotally connected at 280 to the rear of the main frame. The stabilizing bar 276 extends downwardly from its connection 278 with the rear lower horizontal jack 268 to a further connection at 282 with a rear vertical jack 284. The vertical jacks 272, 284 are pivotally connected at 286, 288 respectively to the main frame 4**.

The operation of the work platform as so far described is as follows. Assume that the platform is suspended between the walls of a workspace with the eight pressure pads of the four horizontal jacks all pushed firmly against the walls to hold the platform in position. Assume that the upper horizontal jacks are located at the front of the slots 230, 232 (i.e. at the right hand sides of these slots as shown in FIG. 10) and that the operator wishes to move the platform forwardly. The operator then retracts the pressure pads of the lower horizontal jacks 266, 268 inwardly, away from the workspace walls, leaving the machine supported only by the upper horizontal jacks 242, 244. He then actuates the hydraulic motor 260 to pull the main frame 204 to the right with respect to the upper jack frame 238, until the upper jacks 242, 244 are positioned at the left hand sides of the slots 230, 232 (as shown in FIG. 10). The upper jack frame 238 is held against movement at this time by the engagement of the upper horizontal jacks 242, 244 against the workspace walls. As the main frame 204 moves forward, it pulls the lower jack frame 263 with it because of the engagement of lower horizontal jacks 266, 268 in the vertical slots 234, 236 in the sides of the main frame (and because of the stabilizing bar connection).

After the main frame 204 has been pulled to the right as far as it will go, the pressure pads of the horizontal jacks 266, 268 of the lower jack frame are extended into firm engagement with the walls of the workspace. The pressure pads of the upper horizontal jacks 242, 244 are then retracted and the hydraulic motor 260 is again actuated to pull the upper jack frame 238 to the right relative to the main frame 204. The main frame 204 and lower jack frame 263 remain fixed at this time because of the engagement of the pressure pads of the lower horizontal jacks 266, 268 against the workspace walls. In this manner, the main frame and upper jack frame are moved alternately to achieve forward movement. The same procedure in reverse is used for reverse movement.

If upward movement is desired, the pressure pads of the lower horizontal jacks 266, 268 are fixed against the workspace walls, the pressure pads of the upper horizontal jacks 242, 244 are retracted, and the vertical jacks 272, 284 are extended to push the main frame 204 upwardly. As the main frame 204 rises, it carries the upper jack frame 238 with it, because of the engagement of the plates 250 of the upper jack frame against the rollers 258 of the main frame, and because of the protrusion of the upper horizontal jacks 242, 244 through the slots 230, 232 in the side plates of the main frame 204. Because the typical application described is for a mine, in which the workspace will usually be tunnel sloping forwardly and upwardly, the vertical motion shown includes a 30 degree forward component for convenience.

After the vertical jacks are extended to the amount desired, the pressure pads of the upper horizontal jacks 242, 244 are extended firmly against the walls of the workspace, the pressure pads of the lower horizontal jacks 266, 268 are retracted away from the workspace walls, and the lower jack frame 263 is then raised by contracting the vertical jacks 272, 284. The vertical jacks 272, 284 are normally simple piston and cylinder hydraulic jacks, rather than screw jacks, and contain conventional lock valves (not shown) to hold them against sudden loss of pressure in the event of a failure elsewhere in the hydraulic system.

The horizontal jacks 242, 244, 266, 268 may be of any appropriate construction. Although illustrated as single tubes, they may be exactly the same as the side-by-side jack arrangement shown for the embodiment of FIGS. 1 to 9. Alternatively, they may as illustrated be housed in single frame or outer tubes, with inner extensible jack tubes each of which can be extended as desired to press against the tunnel walls. (An illustrative jack construction is described in the co-pending application Ser. No. 757,980 of John Van de Vegte filed concurrently herewith.) There will of course be an indicator and a safety interlock to ensure that the jacks of one frame cannot be retracted unless those of the other frame are pressed against the tunnel walls.

In addition, in order to permit lining up the main frame parallel to the tunnel walls for accurate drilling, some clearance may be provided between the main frame 204 and the lower jack frame 263, so that the main frame can be rotated slightly relative to the lower jack frame, using the jacks of the upper jack frame. The side clearance between the upper jack frame and the main frame is slight, so that the main frame can be moved accurately from side to side using the jacks of the upper jack frame.

One of the main differences between the FIGS. 10 to 18A embodiment and the FIGS. 1 to 9 embodiment is that in the FIGS. 10 to 18A embodiment, horizontal and vertical movement of the operator platform have largely been separated by connecting the two jack frames through a separate operator platform, instead of connecting them directly to each other.

What I claim as my invention is:

1. A work platform for use in a workspace having generally opposed spaced walls, said platform comprising (a) a lower jack frame having lower horizontal jack means thereon, said lower horizontal jack means including opposed pressure members extensible to press against said walls to support said lower jack frame between said walls, (b) an upper jack frame having upper horizontal jack means thereon, said upper horizontal jack means including opposed pressure members extensible to press against said walls to support said upper jack frame between said walls, (c) and connecting means coupling said jack frames together for forward and rearward movement of said jack frames relative to each other and for generally vertical movement of said jack frames relative to each other, said connecting means including first motive means for moving said jack frames forwardly and rearwardly relative to each other, and second motive means for moving said jack frames generally vertically relative to each other.

2. A work platform according to claim 1 wherein said connecting means includes three generally vertically oriented jacks each extensible and retractable to move said jack frames vertically apart or together, said vertical jacks constituting said second motive means.

3. A work platform according to claim 2 wherein said upper horizontal jack means comprises two pairs of upper jacks, each pair being spaced in a front to rear direction from the other pair and the two jacks of each pair being opposed to each other, and said lower jack means similarly comprises two pairs of lower jacks, each lower jack pair being spaced in a front to rear direction from the other lower jack pair and the two lower jacks of each lower jack pair being opposed to each other, each of said upper and lower jacks having a free end on which is mounted one of said pressure members.

4. A work platform according to claim 3 including indicating means associated with each horizontal jack and responsive to a predetermined pressure of the pressure member of such horizontal jack against a said wall for indicating that such pressure member is pressing against said wall with said predetermined force.

5. A work platform according to claim 4 wherein said indicating means for each horizontal jack includes a compression spring, and means coupled between said spring and said pressure member for compressing said spring as said horizontal jack is moved outwardly to press said pressure member against said wall.

6. A work platform according to claim 5 including an actuating circuit for actuating said upper jacks and another actuating circuit for actuating said lower jacks, each indicating means of each upper jack including means responsive to the compression of its compression spring for disabling the actuating circuit of said lower jacks to prevent retraction of said lower jacks unless the pressure member of such upper jacks is presser against a said wall with said predetermined force, each indicating means of each lower jack including means responsive to the compression of its compression spring for disabling the actuating circuit of said upper jacks to prevent retraction of said upper jacks unless the pressure member of such lower jack is pressed against a said wall with said predetermined force.

7. A work platform for use in a workspace having generally opposed spaced walls, said platform comprising:

(1) a lower jack frame, (2) an upper jack frame, (3) a plurality of vertical jacks pivotally connected between said lower jack frame and said upper jack frame to vary the vertical distance between said lower jack frame and said upper jack frame and to permit forward and rearward swinging of said lower and upper jack frames relative to each other, (4) a pair of spaced horizontal jacks extending horizontally from one side of each of said lower and upper jack frames and at least one further horizontal jack extending from the opposite side of each of said lower and upper jack frames, each horizontal jack terminating in a free end having a pressure member thereon, said free ends of said horizontal jacks being extensible to a position in which said pressure members press against said walls to support said platform between said walls, (5) forward movement means coupled between said lower and upper jack frames for moving said lower and upper jack frames forwardly and rearwardly relative to each other, so that said platform may typically be advanced in said work space by releasing the pressure of said pads of said horizontal jacks on said lower jack frame against said walls while retaining the pressure of said pads of said horizontal jacks on said upper jack frame against said walls, activating said forward movement means to swing said lower jack frame forwardly with respect to said upper jack frame, extending the free ends of said horizontal jacks of said lower jack frame to press the pressure pads thereof against said walls to support said platform, retracting the free ends of said horizontal jacks of said upper jack frame to retract the pads thereof away from said walls, activating said forward movement means to swing said upper jack frame forwardly with respect to said lower jack frame, extending the free ends of said horizontal jacks of said upper jack frame to press the pressure pads thereof against said walls to support said platform, and repeating such steps.

8. A platform according to claim 7 wherein said pivotal connection of said vertical jacks to said lower and upper jack frames is such as to allow side to side swinging of said lower and upper jack frames relative to each other, said platform further including a side movement jack extending diagonally in a side to side direction, and means connecting said side movement jack between said lower and upper jack frames so that extension and retraction of said side movement jack will swing said lower and upper jack frames from side to side relative to each other.

9. A platform according to claim 8 wherein said vertical jacks are three in number, to facilitate control of the plane of the lower jack frame relative to the plane of the upper jack frame.

10. A platform according to claim 9 wherein said horizontal jacks are at least eight in number, four such horizontal jacks on each of the lower and upper jack frames, one horizontal jack being at each side of said upper jack frame and said lower jack frame near the front thereof, and one horizontal jack being at each side of said upper jack frame and said lower jack frame near the rear thereof,

11. A platform according to claim 10 wherein said lower jack frame is longer than said upper jack frame and extends rearwardly beyond said upper jack frame, one of said vertical jacks being located at the rear of said upper jack frame and extending downwardly therefrom, said forward movement means being a jack connected to said one vertical jack at a position part way up said one vertical jack and extending rearwardly and downwardly therefrom to the rear part of said lower jack frame, the other two said vertical jacks being located near the front of said platform, the central part of said lower jack frame between the front and rear vertical jacks being substantially clear of impediments so that an operator may stand on said central part and move about thereon, said upper jack frame including a pair of parallel side sections extending in a front to rear direction and defining an open space therebetween, said open space being bounded at its front and rear by said horizontal jacks of said upper jack frame, so that an operator may stand on the central part of said lower jack frame with his head projecting through said open space above said upper jack frame.

12. A platform according to claim 11 wherein there are two said side movement jacks, one extending from said lower jack frame and being connected to said rear vertical jack at a position part way up said rear vertical jack, and the other extending from said lower jack frame and being connected to one of said front vertical jacks at a position part way up such front vertical jack.

References Cited

UNITED STATES PATENTS

| | | | |
|---|---|---|---|
| 1,380,074 | 5/1921 | Myers | 182—128 |
| 2,955,808 | 10/1960 | Kandle | 299—31 |
| 3,370,888 | 2/1968 | Skendrovic | 182—128 X |
| 3,379,264 | 4/1968 | Cox | 175—94 X |

FOREIGN PATENTS

| | | |
|---|---|---|
| 1,306,821 | 9/1962 | France. |
| 826,971 | 1/1952 | Germany. |
| 69,272 | 5/1945 | Norway. |

DENNIS L. TAYLOR, Primary Examiner

U.S. Cl. X.R.

61—63